E. H. Kellogg.
Flour-Bolt.
No 73981    Fig. 1.    Patented Feb. 4, 1868.
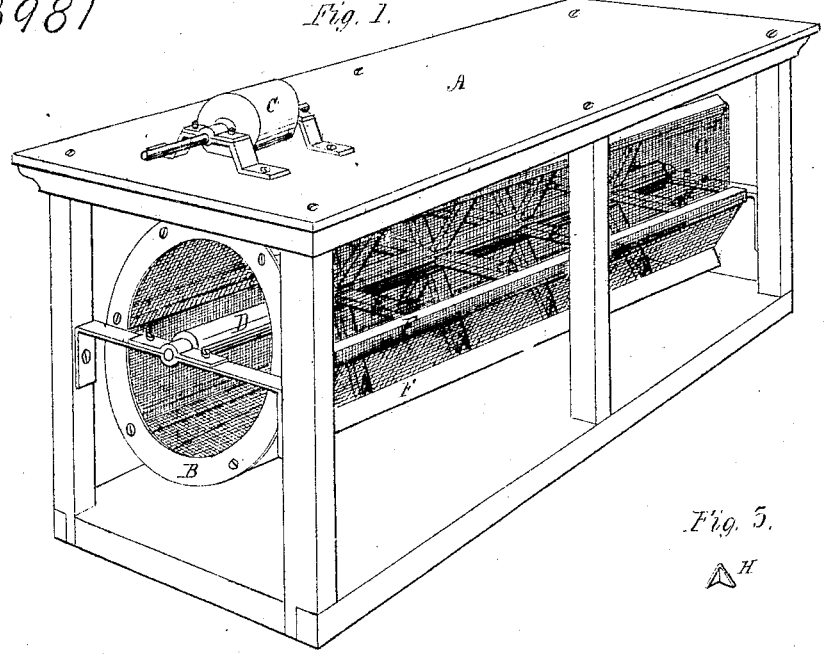
Fig. 3.
Fig. 2.
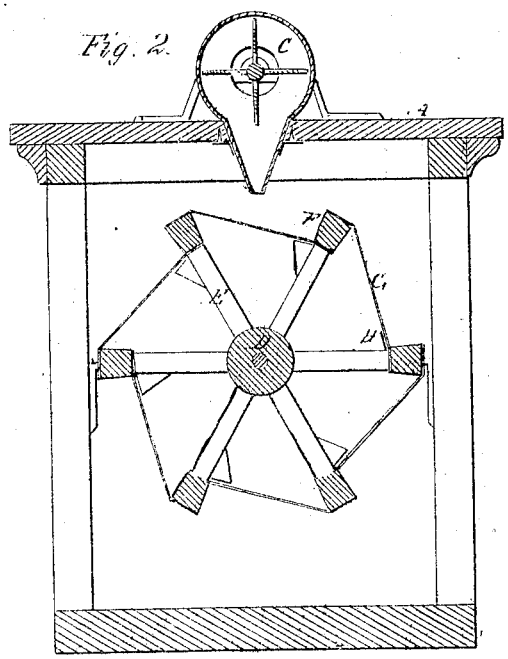
Witnesses.
Inventor
E. H. Kellogg

United States Patent Office.

E. H. KELLOGG, OF MUKWONAGO, WISCONSIN.

*Letters Patent No. 73,981, dated February 4, 1868.*

IMPROVED FLOUR-BOLT.

*The Schedule referred to in these Letters Patent and making part of the same.*

TO ALL WHOM IT MAY CONCERN:

Be it known that I, E. H. KELLOGG, of the town of Mukwonago, county of Waukesha, and State of Wisconsin, have invented a new and useful Improvement in Flour-Bolts; and I do hereby declare that the following is a full, clear, and exact description thereof, which will enable those skilled in the art to make and use the same, reference being had to the accompanying drawing, forming part of this specification, in which—

Figure 1 is a perspective view.

Figure 2, a transverse sectional view.

Figure 3, incline to keep the meal from lodging on the bolt-arms.

Similar letters of reference in each of the figures indicate corresponding parts.

The object of my invention is to construct a flour-bolt so that the meal shall be thrown from square to square of the bolting-reel before the meal rises to the top of the bolt, and yet be thrown clear from the cloth, without sliding upon it, and without lodging on the ribs of the reel; and also for the use of blowers, to throw a current of air on to the outside of the bolting-cloth to cool the meal, and to clear the meshes of the cloth.

My bolt-reel is made in the ordinary manner, but I attach my bolting-cloth to the ribs of the reel, one edge on the outside, and the other on the inside of each square. This, as the reel turns, makes the forward edge of each square further from the centre of motion than the after edge.

A is the bolting-chest; B, the bolt; C, fan-blower, on the top of the chest, with its discharge-orifice near the top of the bolt; D, bolt-shaft; E, arms; F, ribs; G, bolting-cloth; H, inclines on the bolt-arms, to keep the meal from lodging on the arms.

Operation: Motion is given to the bolt in any suitable manner, and the meal conveyed into it in the ordinary manner. Fan C is operated by a belt over a pulley on its shaft. This shaft may be extended, and a series of blowers put on it, covering such length of the bolt as may be desired. As the bolt revolves, the meal falls from square to square inside of the centre shaft, instead of being thrown over, as in the ordinary bolt. The blower throws a current of air on to the top of the bolting-cloth, which keeps the meal or flour from sticking in the meshes of the cloth.

What I claim as my invention, and desire to secure by Letters Patent, is—

1. Attaching the bolting-cloth, one edge to the outside and the other to the inside of the ribs of each square of a bolting-reel, as described.

2. Inclines H, in combination with arms E and ribs F of a bolting-reel, substantially as and for the purposes described.

E. H. KELLOGG.

Witnesses:
   J. B. SMITH,
   G. W. MYGATT.